US010086945B2

(12) United States Patent
Steinert et al.

(10) Patent No.: US 10,086,945 B2
(45) Date of Patent: Oct. 2, 2018

(54) VALVE FOR CONTROLLING THE INTERNAL PRESSURE IN A CABIN OF AN AIRCRAFT

(75) Inventors: Martin Steinert, Seligenstadt (DE); Axel Springer, Seligenstadt (DE)

(73) Assignee: Nord-Micro GmbH & Co. OHG, Frankfurt (DE)

( * ) Notice: Subject to any disclaimer, the term of this patent is extended or adjusted under 35 U.S.C. 154(b) by 1292 days.

(21) Appl. No.: 13/816,203

(22) PCT Filed: May 17, 2011

(86) PCT No.: PCT/EP2011/058006
§ 371 (c)(1),
(2), (4) Date: Apr. 22, 2013

(87) PCT Pub. No.: WO2012/019796
PCT Pub. Date: Feb. 16, 2012

(65) Prior Publication Data
US 2013/0210330 A1    Aug. 15, 2013

(30) Foreign Application Priority Data

Aug. 9, 2010    (DE) .................... 10 2010 033 827

(51) Int. Cl.
*B64D 13/04*    (2006.01)
*G05D 7/06*    (2006.01)
(Continued)

(52) U.S. Cl.
CPC ............ *B64D 13/04* (2013.01); *B64D 13/02* (2013.01); *F16K 1/223* (2013.01); *F16K 39/028* (2013.01);
(Continued)

(58) Field of Classification Search
CPC ...... F16K 1/223; F16K 39/024; F16K 39/026; F16K 39/028; F16K 1/221; B64D 13/02;
(Continued)

(56) References Cited

U.S. PATENT DOCUMENTS 3,544,045 A * 12/1970 Butscher ................ B64D 13/02
244/129.1
5,674,125 A * 10/1997 Xia ........................ F16K 1/223
454/327
(Continued)

FOREIGN PATENT DOCUMENTS

DE    10 2007 036999 A1    2/2009
FR          1178171 A  *  5/1959 ............. E02B 13/02
WO    2005/023649 A1    3/2005

OTHER PUBLICATIONS

European Extended Search Report, European Application No. 14190707. 1, dated Feb. 15, 2015.
(Continued)

*Primary Examiner* — Steven B McAllister
*Assistant Examiner* — Steven Anderson, II
(74) *Attorney, Agent, or Firm* — Thomas B. Ryan; Harter Secrest & Emery LLP

(57) ABSTRACT

The invention relates to a valve (10) for controlling the internal pressure p in a cabin of an aircraft, comprising a first flap (11) and a second flap (12), wherein the flaps (11, 12) control a pressure-changing fluid flow (L) between the surroundings and the cabin through an opening (15) of a limiting element (14) of the cabin. In order to increase the inflow volume of the fluid, according to the invention at least one of the flaps (11, 12) is adjustable in the inflow position in respect of the opening (15) in the direction of the surroundings, such that the flow surface of the flap (11, 12) is increased for the air flow (L). Furthermore according to the invention at least one of the flaps (11, 22) has a closure
(Continued)

device (21) which reduces an outflow of the fluid that had previously flowed in during an inflow process. According to the invention, a closure-device (21) is furthermore arranged, wherein said closure device closes a region between the first flap (11) and the second flap (12) in the inflow position of the flaps (11, 12).

21 Claims, 7 Drawing Sheets

(51) Int. Cl.
    B64D 13/02      (2006.01)
    F16K 1/22       (2006.01)
    F16K 39/02      (2006.01)
(52) U.S. Cl.
    CPC ............ *G05D 7/0647* (2013.01); *Y02T 50/44* (2013.01); *Y10T 137/87917* (2015.04)
(58) Field of Classification Search
    CPC .......... B64D 2700/62035; B64D 13/00; B64D 13/04; G05D 7/0647
    See application file for complete search history.

(56) References Cited

U.S. PATENT DOCUMENTS

| | | | |
|---|---|---|---|
| 6,273,136 B1 | 8/2001 | Steinert et al. | |
| 8,245,976 B2* | 8/2012 | Sakurai | B64C 21/02 244/129.5 |
| 8,376,818 B2* | 2/2013 | Horner | B64D 13/02 244/129.5 |
| 8,915,776 B2* | 12/2014 | Heuer | B64D 13/02 244/1 R |
| 2004/0149340 A1* | 8/2004 | Steinert | B60H 1/249 137/601.08 |
| 2004/0164267 A1* | 8/2004 | Lee | F16K 51/02 251/301 |
| 2004/0238046 A1* | 12/2004 | Hoffman | B60H 1/248 137/601.08 |
| 2006/0237680 A1* | 10/2006 | Denike | B64D 13/02 251/305 |
| 2007/0089746 A1 | 4/2007 | Mitchell et al. | |
| 2009/0308978 A1* | 12/2009 | Kelnhofer | B64D 13/04 244/129.5 |
| 2010/0001127 A1* | 1/2010 | Petrac | B64D 13/04 244/1 R |
| 2010/0006788 A1 | 1/2010 | Tanner et al. | |
| 2010/0096503 A1 | 4/2010 | Tanner et al. | |
| 2010/0291852 A1 | 11/2010 | Steinert et al. | |
| 2010/0320318 A1 | 12/2010 | Roth et al. | |
| 2011/0165828 A1* | 7/2011 | Horner | B64D 13/02 454/74 |
| 2012/0042955 A1* | 2/2012 | Gierszewski | F02D 9/1055 137/1 |

OTHER PUBLICATIONS

PCT International Preliminary Report on Patentability in corresponding International Application No. PCT/EP2011/058006 dated Feb. 12, 2013 (1 page).

PCT International Search Report in corresponding International Application No. PCT/EP2011/058006 dated Feb. 16, 2012 (3 pages).

PCT Written Opinion of the International Searching Authority in corresponding International Application No. PCT/EP2011/058006 dated Feb. 9, 2013 (12 pages).

* cited by examiner

VALVE FOR CONTROLLING THE INTERNAL PRESSURE IN A CABIN OF AN AIRCRAFT

The present invention relates to a valve for controlling the internal pressure in a cabin of an aircraft, comprising a first flap and a second flap, wherein the flaps control a pressure-changing fluid flow between the environment and the cabin through an opening in a limiting element of the cabin.

Valves of this type are used to control the pressure within an aircraft cabin or a pressure chamber. In order to control the pressure in a vehicle cabin, the valve is inserted in an opening in the fuselage. According to the position of the valve, air can flow in or out. The pressure in the cabin can thus be increased or reduced with the aid of the valve. Moreover, stale air which is present in the vehicle cabin can be extracted via the valve.

DE 10 2008 040 184 A1 discloses a valve which has two adjustable flaps. According to the position of the flaps, air flows either out of or into the vehicle cabin. A drawback in this, however, is that air turbulences are generated behind the flap, which air turbulences suck a part of the inflowing air back out of the interior of the vehicle cabin.

The object of the present invention consists in refining a valve of the type stated in the introduction such that the inflow quantity of the fluid into the cabin is increased.

For the achievement of the object, it is proposed in a valve of the type stated in the introduction that at least one of the flaps, in the inflow position, is adjustable with respect to the opening in the direction of the environment such that the flow surface of the flap is increased for the air flow.

For the achievement of the object, it is further proposed in a valve of the type stated in the introduction that at least one of the flaps has a closure device, which, during an inflow process, reduces an outflow of the fluid that has previously flowed in.

The inventive valve is distinguished by the fact that the quantity of air flowing into the cabin is increased. Should the air conditioning system fail, for example, the supply of fresh air into the vehicle cabin can thus be ensured.

Advantageously, the closure device is configured as a controllable closure flap. A gap between the first flap and the second flap can hereby be reduced or closed off. An outflow of air between the gap of the first flap and of the second flap is hence prevented.

In an advantageous embodiment, the closure flap is arranged in a pivotably movable manner on one of the flaps. The closure flap can hence be pivoted during the inflow process in the direction of the other flap in order thus, to reduce or close off the gap between the two flaps.

The closure flap is advantageously arranged on the first flap. The closure flap can be connected to the first flap by means of kinematics in order thus to control the position of the closure flap simultaneously with the first flap.

In a further advantageous embodiment, the closure flap is connected to a controllable actuator. The controllable actuator enables exact positioning of the closure flap in relation to the two flaps. It is thereby possible for the closure flap to close off the gap between the first and the second flap as the air flows in.

For the achievement of the object in a valve of the type stated in, the introduction, it is additionally proposed to provide a closure device which, in the inflow position of the flaps, closes off a region between the first flap and the second flap.

In one embodiment, the closure device is configured as a closure flap, which is mounted in a pivotably movable manner on a frame of the valve. It is thereby possible to reduce or close off a gap between the first flap and the second flap. An outflow of air between the two flaps is consequently prevented.

Advantageously, the closure flap, in the inflow position of the flaps, bears against the top edges of the flaps, which top edges project into the aircraft interior. A secure closure of the gap between the first flap and the second flap is thereby ensured.

Advantageously, the closure flap is connected by a linkage mechanism to the second flap and the frame. Hence when the second flap is pivoted, the closure flap is likewise pivoted. An additional actuating device for the pivoting of the closure flap is thereby no longer necessary. Expensive high-maintenance actuating devices which are prone to faults are consequently dispensed with, so that costs are reduced and the service life and reliability of the valve are increased.

Advantageously, the linkage mechanism comprises at least one rod and coupling portions, which latter are arranged on the second flap and/or the frame.

Further advantageously, the closure flap is adjustable via the linkage mechanism in the opposite or same direction to the flaps. When the flaps are pivoted into the inflow position, the flaps and the closure flap initially pivot in the same direction. Beyond a certain pivot angle of the second flap, the closure flap pivots by virtue of the linkage mechanism in the opposite direction to the two flaps.

The closure flap advantageously has on its lateral longitudinal margins curved marginal regions. In this case, the end region of the closure flap has a contour matched to the first flap.

In a further advantageous embodiment, at least one of the marginal regions, in the inflow position of the flap, bears against the frame. As a result of this measure, a good sealing effect is obtained in the closed position of the closure flap.

In a further advantageous embodiment, at least one of the flaps is mounted displaceably with respect to the opening. It is hereby possible to retract the first flap further into the boundary layer of the aircraft flow in order thus to increase the flow surface of the first flap, whereby the air inflow quantity into the vehicle cabin is increased.

To at least one of the flaps is advantageously assigned an actuator, with which the at least one flap is displaceable.

In a further advantageous embodiment, the first flap has an angled-off region. The first flap thereby has a fluidically advantageous shaping, so that a larger quantity of air can flow into the cabin.

Further advantageously, at least one of the flaps is configured such that it is variable in length. The length-variable flap can be used to reduce or prevent an outflow of the air that has previously flowed in. Furthermore, the flow surface can be enlarged by means of the length-variable flap.

In a further advantageous embodiment, the first flap has a spoiler, which is adjustable with respect to the first flap by means of an actuator. The spoiler can be retracted into the boundary layer of the aircraft flow, so that the flow surface of the first flap is enlarged. Consequently, the quantity of air flowing into the cabin is increased.

In a further advantageous embodiment, the first flap is arranged on a swivel mechanism, which is mounted in a pivotably movable manner in the frame of the valve.

Advantageously, the swivel mechanism has two supporting arms mounted in a pivotably movable manner on the frame. A cost-effective swivel mechanism is hereby provided.

In a further advantageous embodiment, an actuating device, with which the flaps and/or the swivel mechanism are adjustable into an outflow and an inflow position, is provided. As a result of the actuating device, the inventive valve can act both as an inflow valve and as an outflow valve. In the outflow position, the air present in the vehicle cabin can be extracted. In the inflow position, ram air/fresh air can be supplied to the vehicle cabin. In consequence, the inventive valve assumes the function of previously two separate systems, whereby weight savings and cost reductions can be made.

Advantageously, the flaps and/or the swivel mechanism are adjustable in the opposite direction and/or in the same direction via the actuating device. The opposite-working adjustability enables the first flap and/or the swivel mechanism to swivel into the inflow position, while the second flap swivels in the opposite direction to the first flap and/or to the swivel mechanism.

The invention is described in greater detail below on the basis of illustrative embodiments represented schematically in the drawing, wherein.

Figure 1:
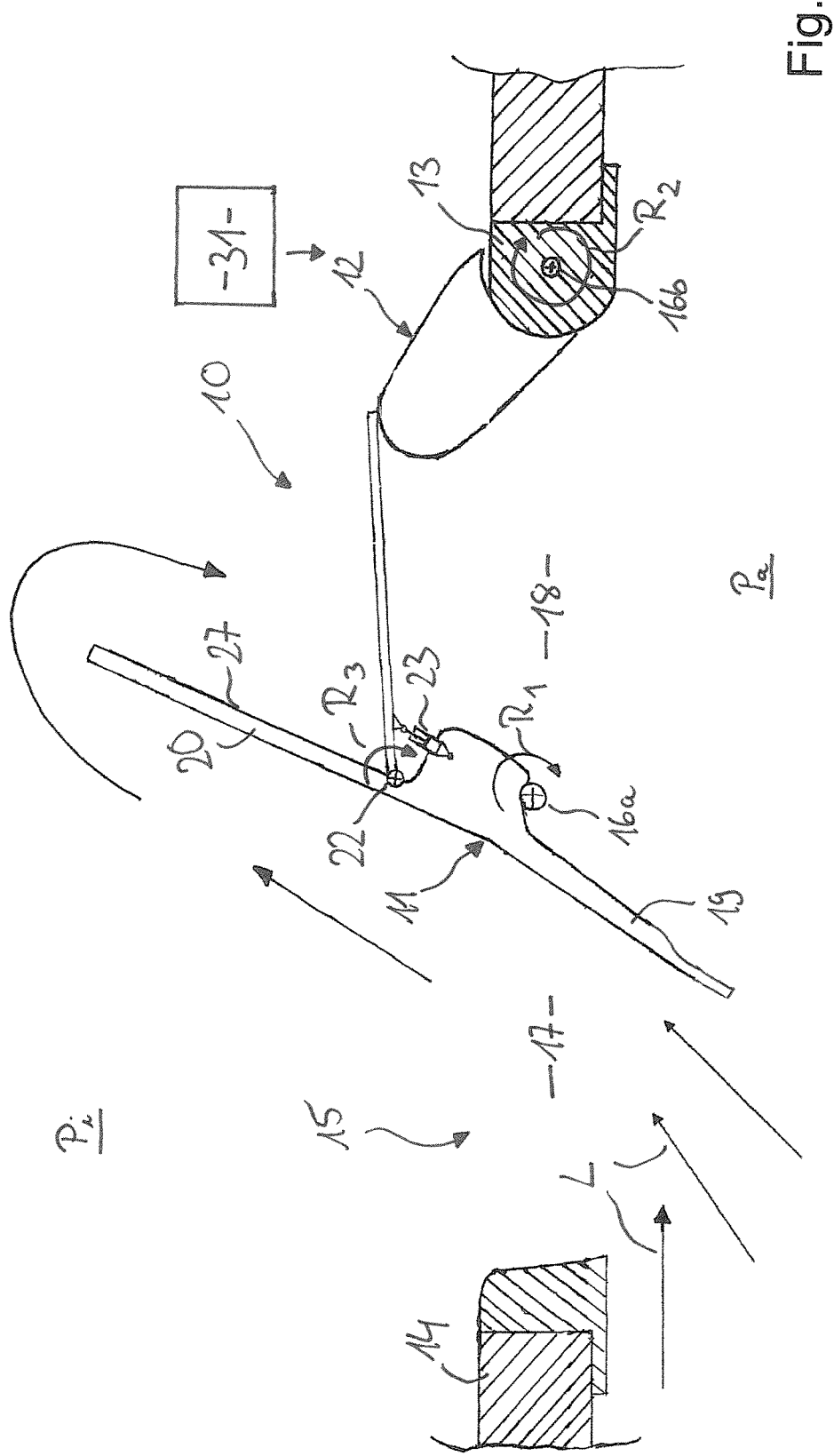
FIG. 1 shows a cross section of a first embodiment of the inventive valve.

FIG. 1 shows a valve 10 according to a first embodiment for controlling an internal pressure $p_i$ in a cabin of an aircraft. The valve 10 has a first flap 11 (ground gate) and a second flap 12 (control gate). Both flaps 11, 12 are arranged movably in a frame 13 by means of bearings 16a, 16b. The frame 13 of the valve 10 is inserted in a limiting element 14 of the aircraft, in the present case in the fuselage. An opening 15, via which air can flow into and out of the cabin, is bounded by the frame 13.

The two flaps 11, 12 are connected by an actuating device 31 (represented schematically). The flaps 11, 12 can hereby be swiveled about the bearings 16a, 16b.

The first flap 11 is eccentrically mounted and has a first portion 19 and a second portion 20. The first portion 19 is angled-off from the second portion 20, whereby an improved air intake is obtained. The cross section of the first portion 19 tapers in the direction of the free end.

On a rear side 27 of the first flap 11 is arranged a closure device 21. In the present illustrative embodiment, the closure device 21 is configured as a closure flap, which is pivotably coupled to the first flap 11 via a bearing 22. The closure device 21 is connected to a first actuator 23 (represented schematically), by means of which the closure device 21 can be swiveled.

For the inflow of air, the flaps 11, 12 swivel into the inflow position shown in FIG. 1. The first flap 11 here swivels in the direction $R_1$ and the second flap in the direction $R_2$. An inflow region 17 is hereby formed. Via the inflow region 17, an inflow of air flow L takes place. Since strong air turbulences, which lower the static external pressure, are formed behind the first flap 11, a part of the air that has flowed in would flow back out through an outflow region 18. In order to prevent this, the closure device 21 is swiveled by means of the first actuator 23 in the direction $R_3$ of the second flap 12. In addition, the second flap 12 is swiveled in the opposite direction to the motional direction $R_2$, shown in FIG. 1, of the second flap 11. As a result, the closure device 21 bears against the second flap 12 and closes off the outflow region 18. The air that has previously flowed in is thus prevented from flowing out. The oppositely directed movement of the two flaps 11, 12 is enabled by the actuator 31 (represented schematically).

For the outflow of air from the aircraft cabin into the environment, the flaps 11, 12 swivel into an outflow position (not represented). The first flap 11 here swivels in the direction $R_1$ such that the free end of the first portion 19 points into the outflow region 18. The second flap 12 swivels in the direction $R_2$. Between the first flap 11 and the second flap 12, the air flows via the outflow region 18 into the environment. The closure device 21 bears during the outflow process against the rear side 27 of the first flap 11 so as not to hinder the outflow of air.

In a closed position (not represented) of the valve 10, the two flaps 11, 12 touch, wherein the free end of the first portion 19 bears against a free end of the second flap 12. In the closed position, the closure device 21 bears against the rear side 27 of the first flap 11.

Figure 2:
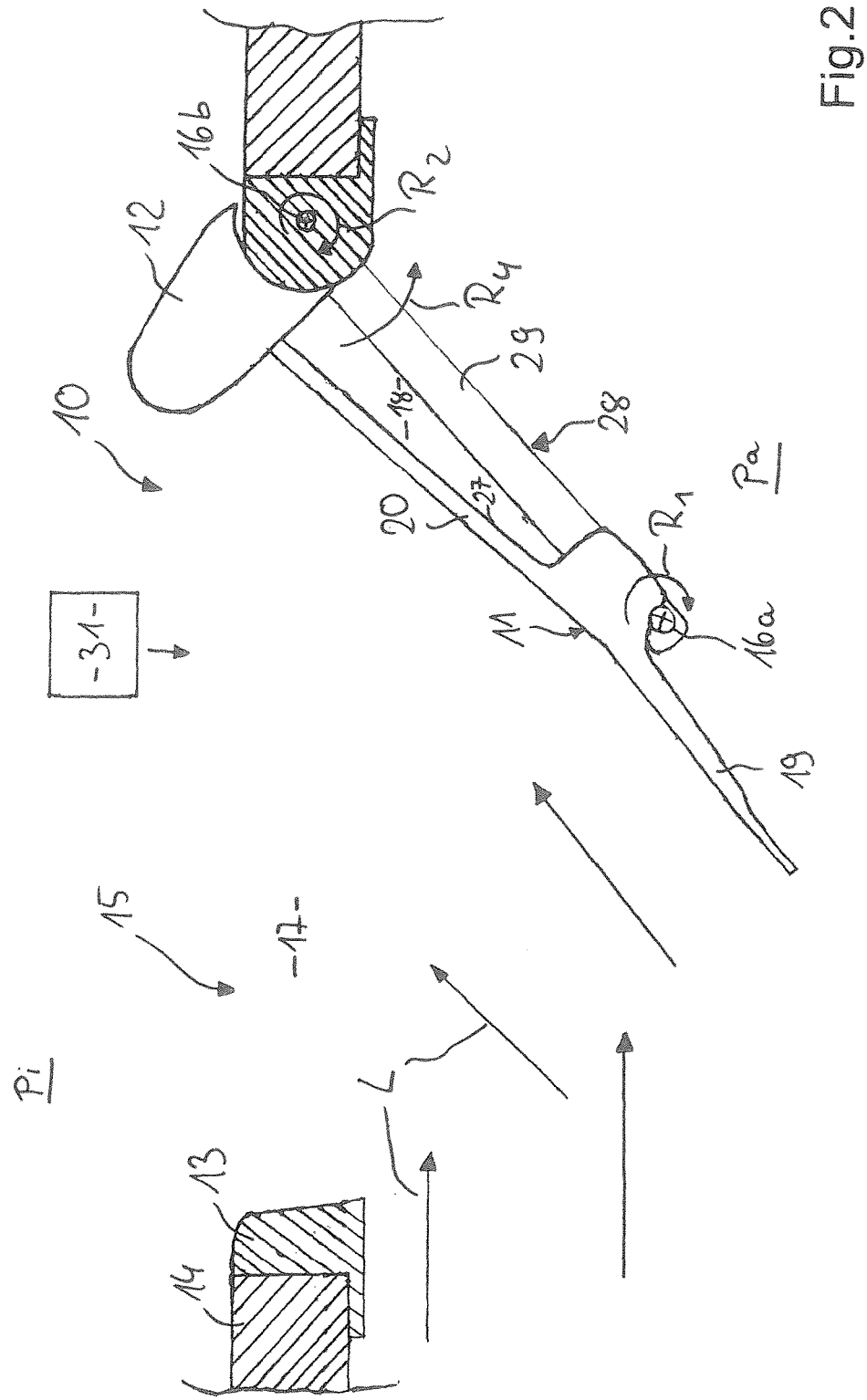
FIG. 2 shows a cross section of a second embodiment of the inventive valve.

In FIG. 2 is shown a further embodiment of the valve 10, for the description of which the previously introduced reference symbols are used for same or functionally identical parts. In this embodiment, the first flap 11 is connected to a swivel mechanism 28. The swivel mechanism 28 has two supporting arms 29, which are mounted pivotably on the bearing 16b in the frame 13 of the valve 10. On the free end of the swivel mechanism 28, the first flap 11 is arranged pivotably on the bearing 16a. The swivel mechanism 28 and the flaps 11, 12 are connected to the actuating device 31 (represented schematically). The flaps 11, 12 and the swivel mechanism 28 can hereby be swiveled about the bearings 16a, 16b.

For the inflow of air, the flaps 11, 12 and the swivel mechanism 28 swivel into the position shown in FIG. 2. The first flap 11 here swivels in the direction $R_1$, the second flap 12 in the direction $R_2$ and the swivel mechanism 28 in the direction $R_4$. The inflow region 17 is thereby formed within the opening 15. Via the inflow region 17, an inflow of air flow takes place. The swivel mechanism 28, the first flap 11 and the second flap 12 are swiveled such that the first flap 11 bears approximately against the second flap 12 so as to close off the outflow region 18.

As a result of the swivel mechanism 28, the first flap 11 can be retracted further into the air flow (L), so that the first flap 11 is flowed against over a larger area. The air inflow quantity and efficiency is thus increased.

For the outflow of air from the aircraft cabin into the environment, the flaps 11, 12 swivel into an outflow position (not represented). The swivel mechanism 28 bears during the outflow process against the frame 13. For the outflow of air, the first flap 11 swivels in such a way in the direction $R_1$ that the free end of the first portion 19 points into the outflow region 18. The second flap 12 swivels in the direction $R_2$. Between the first flap 11 and the second flap 12, the air flows via the outflow region 18 into the environment. The swivel mechanism 28 bears during the outflow process against the frame 13.

In a closed position (net represented) of the valve 10, the two flaps 11, 12 touch, wherein the free end of the first portion 19 bears against a free end of the second flap 12. In the closed position, the swivel mechanism 28 bears against the frame 13.

Figure 3:
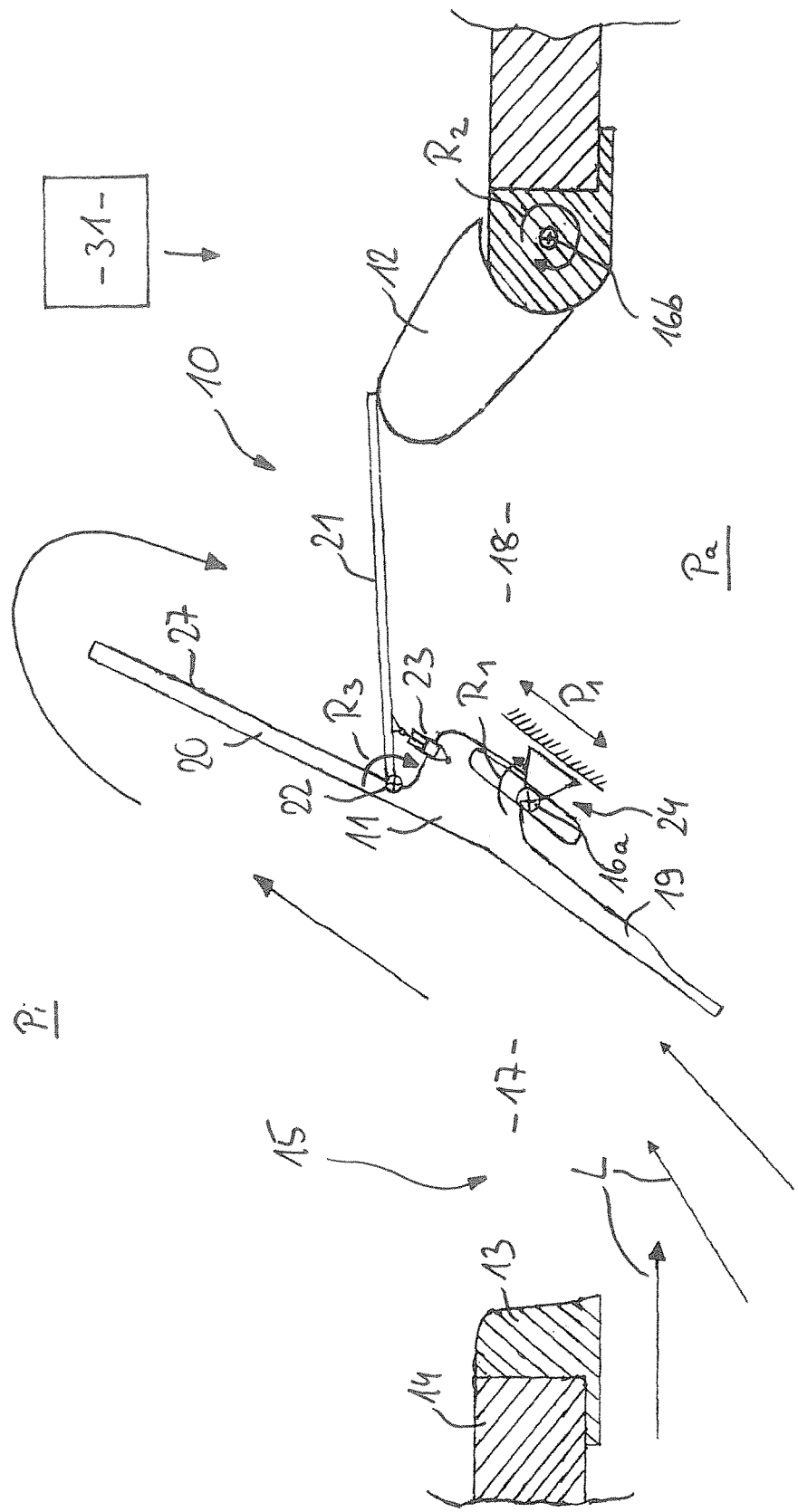
FIG. 3 shows a cross section of a third embodiment of the inventive valve.

In FIG. 3, a further embodiment of the valve 10 is shown, for the description of which the previously introduced reference symbols are used for same or functionally identical parts. In this embodiment, the first flap 11 is displaceably mounted via a bearing 24 (represented schematically). By means of an actuator (not represented), the first flap 11 can be displaced in the direction of the arrow $P_1$. The first flap 11 can thereby be moved into the boundary layer of the aircraft flow, so that the flow surface is enlarged and the quantity of inflowing air is increased.

Figure 4:
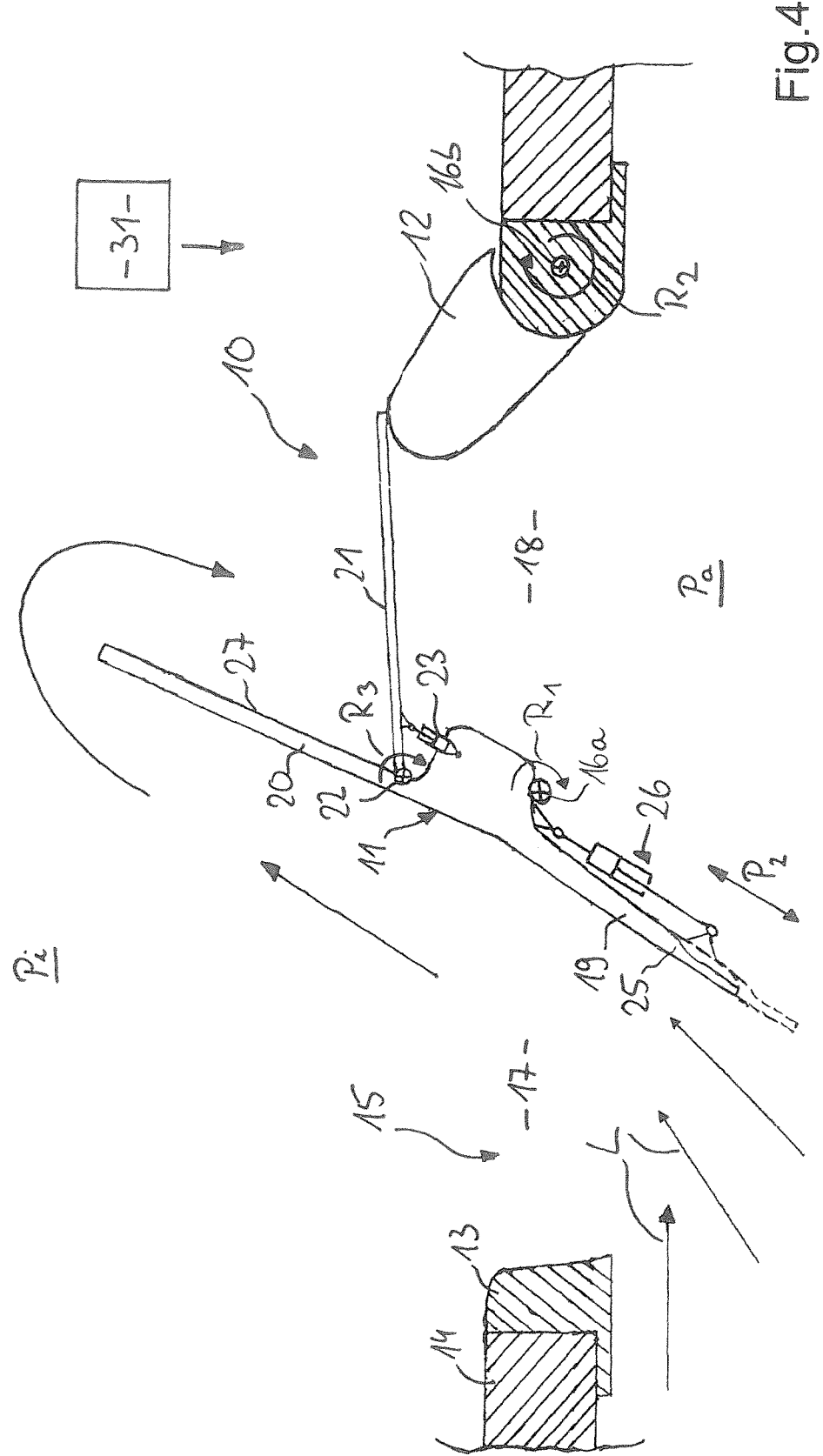
FIG. 4 shows a cross section of a fourth embodiment of the inventive valve.

In FIG. 4, a further embodiment of the valve 10 is shown, for the description of which the previously introduced reference symbols are used for same or functionally identical parts. In this embodiment, an extensible spoiler 25 is arranged on the first portion 19 of the first flap 11. The spoiler 25 is displaceable via a second actuator 26 (represented schematically) in the direction of the arrow $P_2$. In FIG. 3, the spoiler 25 is shown in dashed representation in the extended state. By extending the spoiler 25 into the boundary layer of the aircraft flow, the flow surface is enlarged. A larger quantity of air can hereby flow into the cabin.

Figure 5:
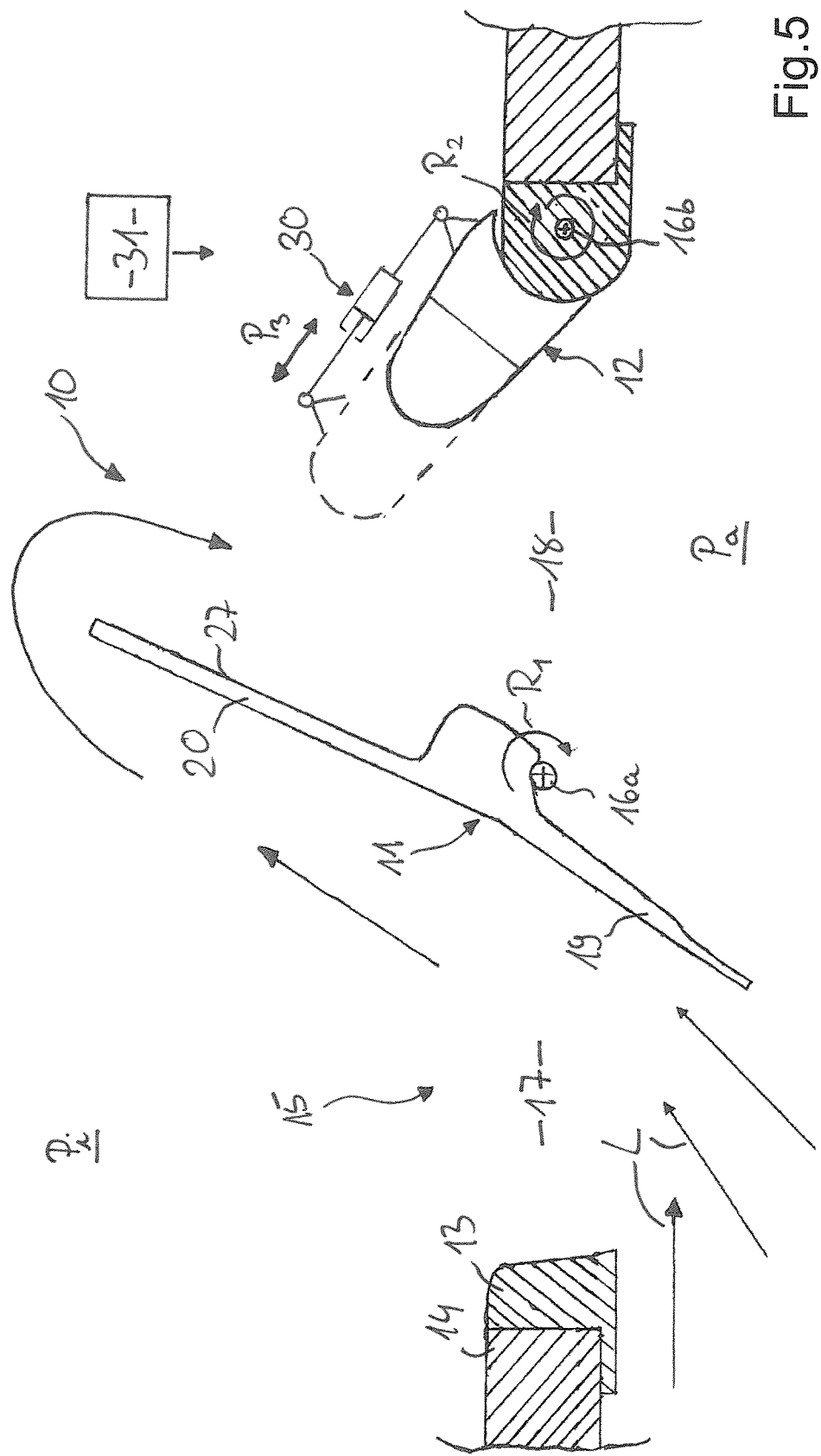
FIG. 5 shows a cross section of a fifth embodiment of the inventive valve.

FIG. 5 shows a further embodiment of the valve 10, for the description of which the previously introduced reference symbols are used for same or functionally identical parts. In this embodiment, the second flap 12 is configured such that it is variable in length. The second flap 12 is displaceable via a third actuator 30 (represented schematically) in the direction of the arrow $P_3$. The outflow region 18 can hereby be reduced or fully closed off so as to reduce or prevent the outflow of the air that has flowed in.

Figure 6:
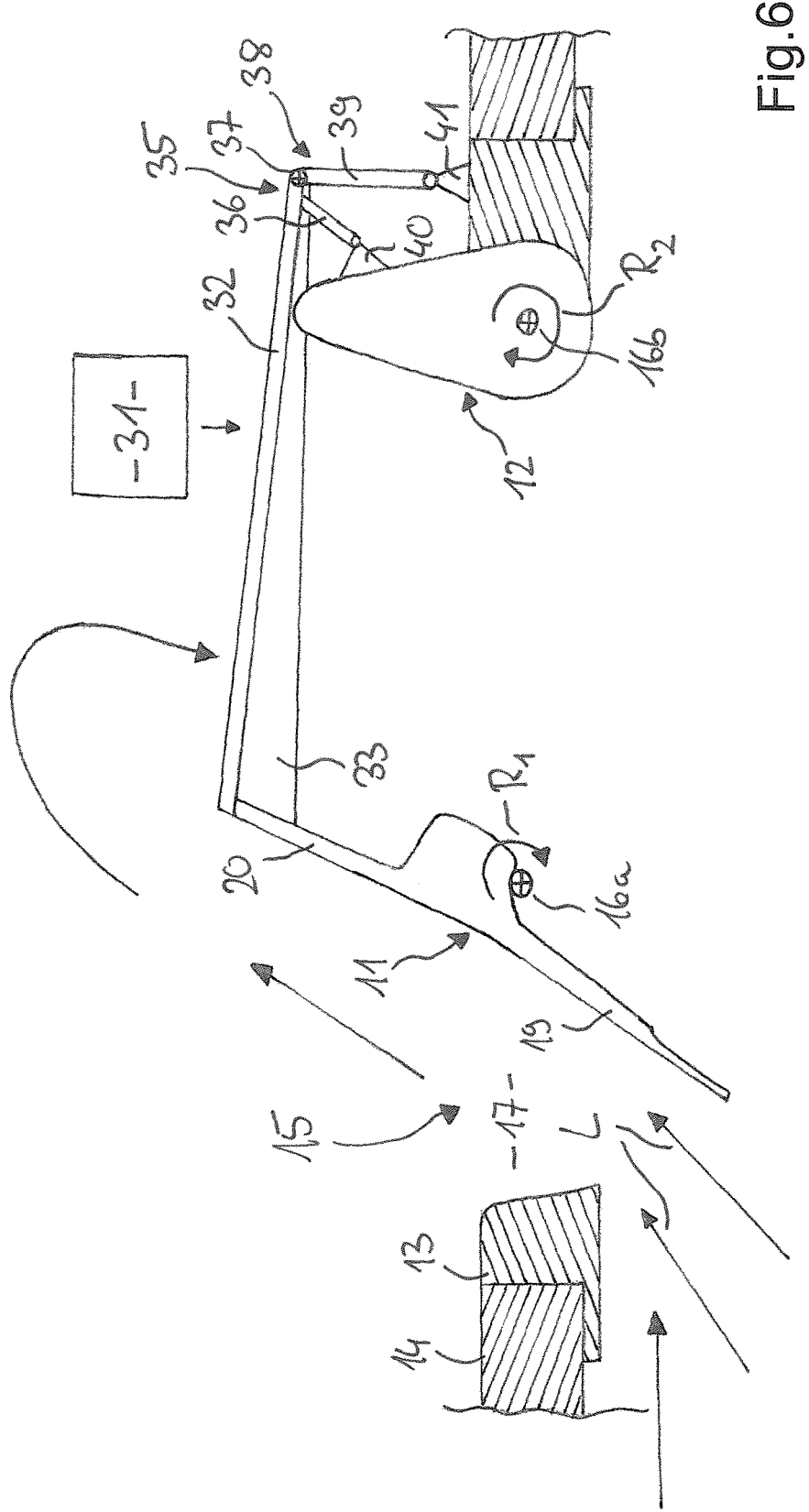
FIG. 6 shows a cross section of a sixth embodiment of the inventive valve.
Figure 7:
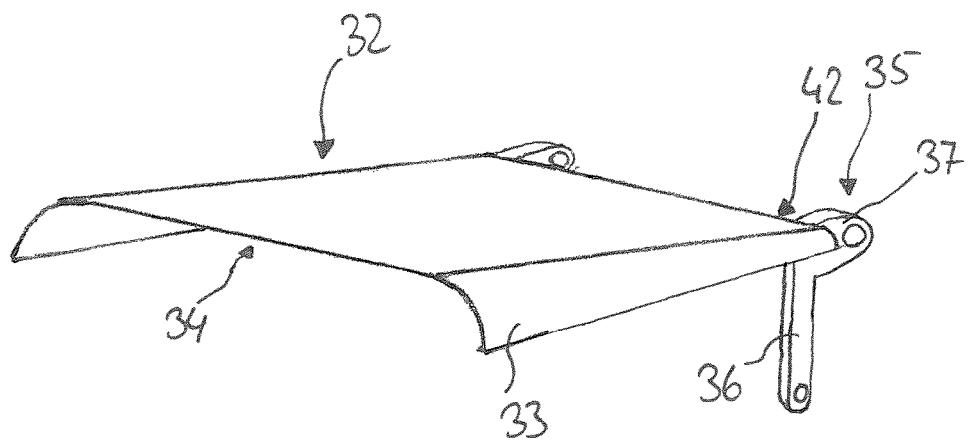
FIG. 7 shows a perspective view of a closure flap of the inventive valve according to the sixth embodiment.

In FIGS. 6 and 7, a further embodiment of the valve is represented, for the description of which the previously introduced reference symbols are used for same or functionally identical parts. The valve 10 according to this embodiment has as the closure device 21 a closure flap 32 mounted in a pivotably movable manner on the frame 13, which closure flap is shown in FIG. 6.

As is represented in FIG. 7, the closure flap 32 has on its longitudinal margins curved marginal regions 33, wherein the marginal regions 33 run with decreasing width rearward from an end face 34 of the closure flap 32. In the inflow position of the flaps 11, 12, the marginal regions 33 of the closure flap 32 bear against the frame 13 of the valve 10.

In addition, the closure flap 32 has on its rear edge 42 coupling members 35. The coupling members 35 have a first bearing portion 36 and a second bearing portion 37. The first bearing portion 36 is configured as a rigid rod and the second bearing portion 37 is configured with a bore.

As is shown in FIG. 6, the closure flap 32 is connected by the coupling members 35 to a linkage mechanism 38, which pivotably connects the closure flap 32 to the second flap 12 and the frame 13. To this end, the linkage mechanism 38 comprises a rod 39, a first coupling portion 40 and a second coupling portion 41. The first coupling portion 40 is arranged on the second flap 12 and is connected to the first bearing portion 36. The second coupling portion 41 is attached to the frame 13 and is connected by the rod 39 to the second bearing portion 37.

For the inflow of air, the flaps 11, 12 swivel into the inflow position shown in FIG. 6. The first flap 11 here pivots in the direction $R_1$. The second flap 12 and the closure flap 32 pivot in the direction $R_2$. Beyond a certain pivot angle of the second flap 12, the closure flap 32 pivots by virtue of the linkage mechanism 38 in an opposite direction to $R_2$, however, until the closure flap 32, in the inflow position shown in FIG. 6, bears against the top edges of the flaps 11, 12. The closure flap 32 thus closes off a region between the two flaps 11, 12, whereby the air that has previously flowed in via the inflow region 17 is prevented from flowing out. The movement of the flaps 11, 12 and of the closure flap 32 is effected by the actuator 31 (represented schematically).

Since the closure flap 32 is coupled via the linkage mechanism 38 to the second flap 12, no separate actuator is required for the pivoting of the closure flap 32.

It is also possible to mutually combine the embodiments according to FIGS. 2 and 3. In addition, the embodiments according to FIGS. 2 and 5 can be provided with a displaceable bearing 24 and/or an extensible spoiler 25. Moreover, the embodiment according to FIG. 5 can additionally be provided with a closure device 21. The embodiment according to FIG. 6 can further be provided with a displaceable bearing 24 and/or an extensible spoiler 25 and/or a swivel mechanism 28.

The actuating device 31 is constituted by a device which is represented schematically. In the present case, any type of suitable actuating device can be used, such as, for example, a motor-driven kinematic system.

The actuators 23, 26, 30 are constituted by parts which are represented schematically. In the present case, any type of suitable actuators can be used.

In the present case, furthermore, any type of suitable swivel mechanism 28 can be used, such as, for example, a frame which is pivotably mounted on the bearing 16b in the frame 13 of the valve 10.

The inventive valve 10 is distinguished by the fact that the air inflow quantity into the cabin is increased. Should the air-conditioning system fail, for example, the supply of fresh air to the cabin can thus be ensured, since the inflowing air is provided in sufficient quantity. Furthermore, in the outflow position of the valves 11, 12, air can be extracted from the aircraft cabin. In consequence, the inventive valve 10 can act as a combined inflow and outflow valve.

| Reference symbol list | |
|---|---|
| 10 | valve |
| 11 | first flap |
| 12 | second flap |
| 13 | frame |
| 14 | limiting element |
| 15 | opening |
| 16a | bearing |
| 16b | bearing |
| 17 | inflow region |
| 18 | outflow region |
| 19 | first portion |
| 20 | second portion |
| 21 | closure device |
| 22 | bearing |
| 23 | first actuator |
| 24 | displaceable bearing |
| 25 | spoiler |
| 26 | second actuator |
| 27 | rear side |
| 28 | swivel mechanism |
| 29 | supporting arm |
| 30 | third actuator |
| 31 | actuating device |
| 32 | closure flap |
| 33 | curved marginal region |

-continued

| Reference symbol list | |
|---|---|
| 34 | end face |
| 35 | coupling members |
| 36 | first bearing portion |
| 37 | second bearing portion |
| 38 | linkage mechanism |
| 39 | rod |
| 40 | first coupling portion |
| 41 | second coupling portion |
| 42 | rear edge |
| L | air flow |
| $R_1$ | motional direction |
| $R_2$ | motional direction |
| $R_3$ | motional direction |
| $R_4$ | motional direction |
| $P_1$ | direction of displacement |
| $P_2$ | direction of displacement |
| $P_3$ | direction of displacement |
| $p_i$ | internal pressure |
| $p_a$ | external pressure |

The invention claimed is:

1. A valve for controlling the internal pressure in a cabin of an aircraft, comprising: a first flap and a second flap, which are movably mounted in a frame; wherein the flaps control a pressure changing fluid flow between the environment outside the aircraft and the cabin inside the aircraft through an opening in the valve bounded by the frame; and wherein the first flap is mounted at a distance from a front edge of the frame and the second flap is mounted on a rear edge of the frame; the first and second flaps being movable to an open position defining (a) an inflow passageway within the opening between the front edge of the frame and the first flap and (b) an outflow passageway within the opening between the first and second flaps; the first and second flaps being movable from the open position through a closed position by which both the inflow passageway and the outflow passageway are progressively closed off, wherein the second flap is movable from the closed position through the open position without opening a fluid flow passageway between the second flap and the rear edge of the frame; and further comprising a closure flap that is mounted on one of the first flap, the second flap, and the frame and is movable for closing the outflow passageway in the open position of the first and second flaps to prevent fluid flow from the cabin inside the aircraft to the environment outside the aircraft along the outflow passageway while fluid flow from the environment outside the aircraft to the cabin inside the aircraft takes place along the inflow passageway,
wherein the closure flap extends between the first flap and the second flap for closing the outflow passageway in the open position of the first and second flaps.

2. The valve as claimed in claim 1, in which the closure flap is arranged in a pivotally movable manner on one of the flaps.

3. The valve as claimed in claim 2, in which the closure flap is arranged on the first flap.

4. The valve as claimed in claim 3, in which the first flap is pivotable in a first direction for opening the inflow passageway and the closure flap is pivotable in an opposite direction for closing the outflow passageway.

5. The valve as claimed in claim 1, in which the closure flap is connected to a controllable actuator.

6. The valve as claimed in claim 1, in which the closure flap is mounted in a pivotally movable manner on the frame of the valve.

7. The valve as claimed in claim 6, in which the first and second flaps include top edges, which, in the open position of the first and second flaps, are arranged face toward the inside of the aircraft, and the closure flap, in the open position of the first and second flaps, bears against the top edges of the first and second flaps for closing the outflow passageway.

8. The valve as claimed in claim 6, in which the closure flap is connected by a linkage mechanism to at least one of the second flap and the frame.

9. The valve as claimed in claim 8, in which the linkage mechanism comprises at least one rod and coupling portions, which coupling portions are arranged on at least one of the second flap and the frame.

10. The valve as claimed in claim 8, in which the closure flap is pivotable via the linkage mechanism in opposite directions.

11. The valve as claimed in claim 6, in which the closure flap has lateral longitudinal margins having curved marginal regions.

12. The valve as claimed in claim 11, in which at least one of the marginal regions bears against the frame in the open position of the first and second flaps.

13. The valve as claimed in claim 1, in which at least one of the first and second flaps is mounted displaceably with respect to the opening.

14. The valve as claimed in claim 13, in which an actuator provides for displacing at least one of the first and second flaps.

15. The valve as claimed in claim 1, in which the first flap has an angled-off region.

16. The valve as claimed in claim 1, in which at least one of the flaps is variable in length.

17. The valve as claimed in claim 1, in which the first flap has a spoiler, which is adjustable with respect to the first flap by means of an actuator.

18. The valve as claimed in claim 1, in which the first flap is arranged on a swivel mechanism, so that the first flap is pivotally movable within the opening of the valve.

19. The valve as claimed in claim 18, in which the swivel mechanism has two supporting arms mounted in a pivotally movable manner on the frame.

20. The valve as claimed in claim 1, comprising an actuating device by which the closure flap is movable into engagement with at least one of the first and second flaps for closing the outflow passageway.

21. The valve as claimed in claim 20, in which the first and second flaps are arranged to be pivoted in opposite directions for approaching the open position of the valve.

* * * * *